Feb. 21, 1928.　　　L. A. SEITZ ET AL　　　1,660,098
TRUCK BRAKE
Filed Dec. 29, 1926　　　2 Sheets-Sheet 1
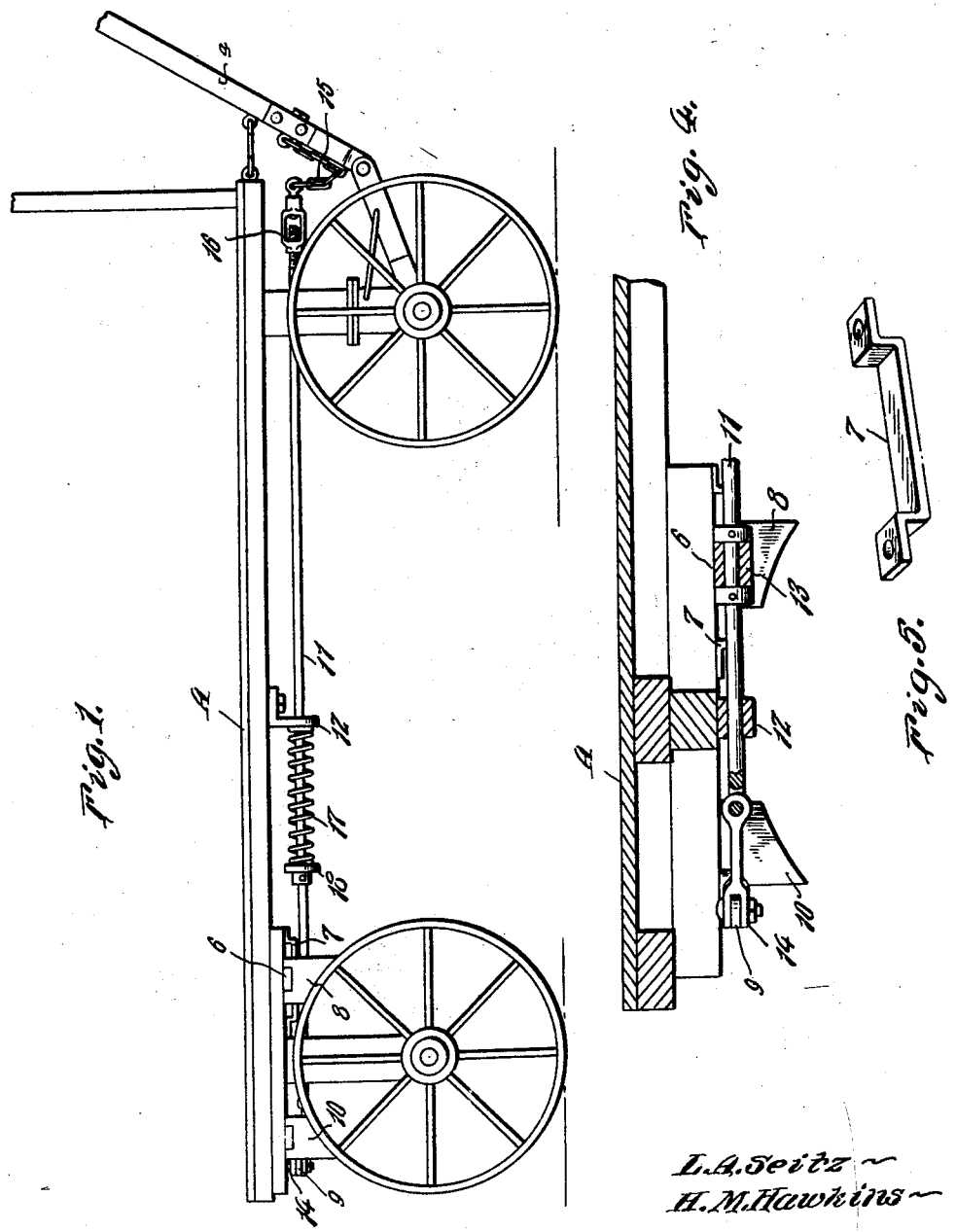
L.A.Seitz
H.M.Hawkins
INVENTORS
BY Victor J. Evans
ATTORNEY Feb. 21, 1928.
L. A. SEITZ ET AL
1,660,098
TRUCK BRAKE
Filed Dec. 29, 1926
2 Sheets-Sheet 2
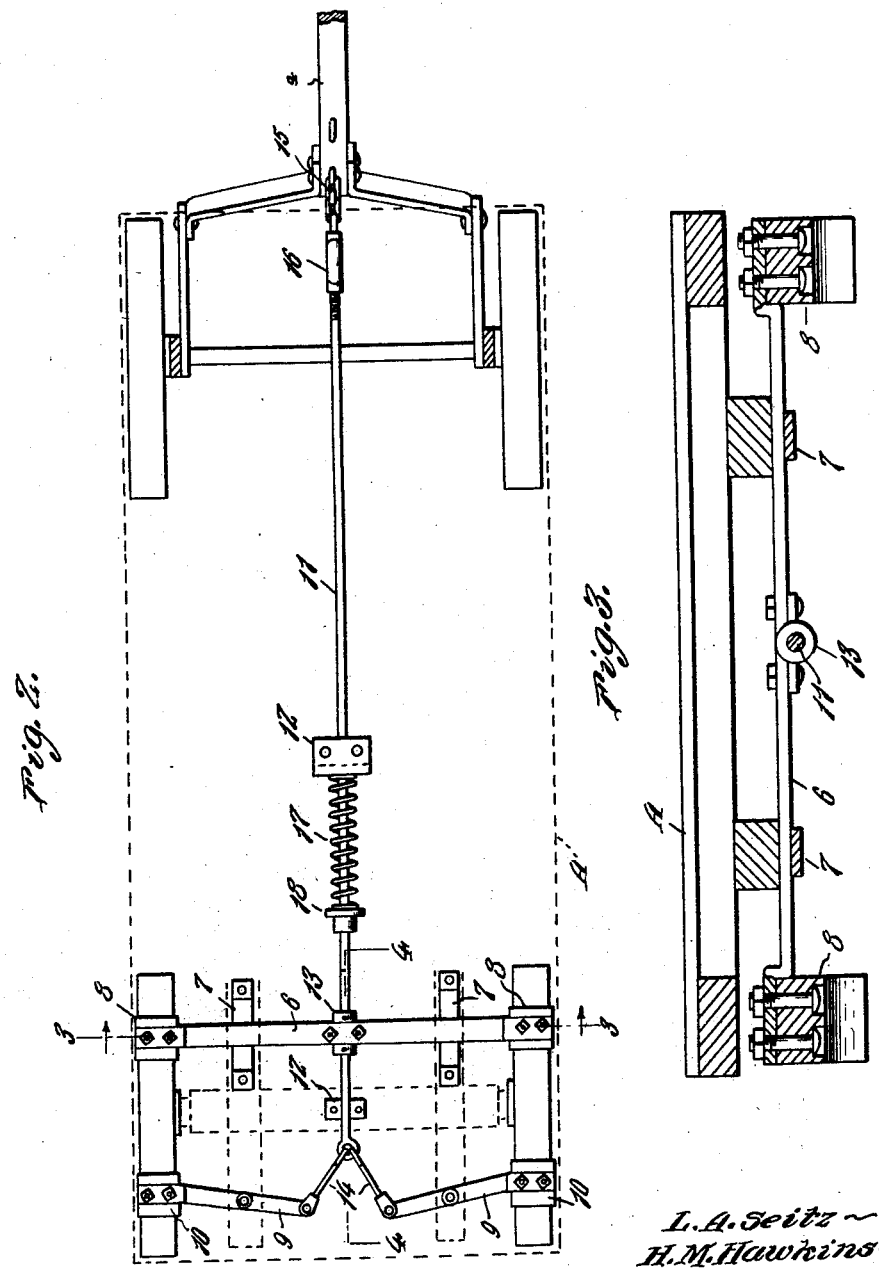

Patented Feb. 21, 1928.

1,660,098

UNITED STATES PATENT OFFICE.

LEE A. SEITZ AND HENRY M. HAWKINS, OF TULSA, OKLAHOMA.

TRUCK BRAKE.

Application filed December 29, 1926. Serial No. 157,832.

This invention relates to a brake for baggage trucks and the like, the general object of the invention being to provide means for automatically applying the brakes to some of the wheels of the truck as soon as the handle of the truck is released so that there is no danger of the truck running away after it is stopped, with means for releasing the brakes when the handle is moved to a position where the truck can be pulled along by a person grasping the handle.

A further object of the invention is to so arrange the brakes that they will prevent movement in either direction of the truck.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view showing the handle in raised position and the brakes in braking position.

Figure 2 is a plan view with the body of the truck shown in dotted lines.

Figure 3 is a section on line 3—3 of Figure 2.

Figure 4 is a section on line 4—4 of Figure 2.

Figure 5 is a view of one of the hangers for the front brake beam.

In these views, A indicates a truck used for hauling baggage and the like and $a$ indicates the handle for pulling or pushing the truck along.

In carrying out our invention, we provide a brake beam 6 which is movably supported under the body of a truck adjacent the rear thereof by the hangers 7 which are fastened to the under face of the body. This beam carries a brake shoe 8 at each end, these shoes being adapted to engage the rear wheels. A pair of brake levers 9 is pivoted to the under face of the truck body a short distance from the rear end thereof and the outer end of each lever 9 has secured thereto a brake shoe 10 for engaging a rear wheel. The shoes 10 are spaced from the shoes 8 so as to engage different portions of the wheels.

A longitudinally extending rod 11 is slidably mounted under the truck body by the depending brackets 12 and this rod passes through a bracket 13 at the center of the beam 6 and is suitably connected to said bracket so that the beam must move with the rod. Links 14 connect the inner ends of the levers 9 with the rear end of the rod 11 and a chain 15 is connected with the front end of the rod 11 by the turnbuckle 16, the other end of the chain being connected with the handle $a$. A coiled spring 17 is placed on the rod 11 and bears against one of the brackets 12 and a collar 18 fastened to the rod and said spring tends to move the rod 11 rearwardly and as the beam 6 moves with the rod, the shoes 8 carried by said beam will be forced against the front portions of the rear wheels and the said movement of the rod 11 will also be communicated to the levers 9 by the links 14 so that the shoes 10 will be forced against the rear portions of the rear wheels. Thus the wheels will be braked in two directions so that it will be impossible for the truck to move in either direction. When the handle is pulled downwardly in order to place it in a position where it can be used to pull the truck forwardly or to push the truck rearwardly, the movement of the handle will tighten the chain 15 and thus cause it to exert a pull on the rod 11 and this forward movement will move the brake parts so as to move the shoes away from the rear wheels and this movement will apply tension to the spring 17 so that as soon as the handle is released, the spring will act to apply the brakes again by moving the rod 11 rearwardly.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In combination with a truck, a brake beam slidably connected with the bottom of the truck, shoes carried by said beam for engaging the rear wheels of the truck, a pair of pivoted levers, a shoe carried by each lever for engaging one of the rear wheels of the truck, a longitudinally movable rod supported by the truck, links connecting the inner ends of the levers to the end of the said rod, means for connecting the brake beam to said rod, spring means for holding the rod in its rearmost position to cause the shoes to engage the wheels and means for connecting the front end of the rod to the handle of the truck so that as the handle is lowered, it will pull the rod forwardly and thus move the shoe carrying means to disengage the shoes from the wheels.

In testimony whereof we affix our signatures.

LEE A. SEITZ.
HENRY M. HAWKINS.